United States Patent [19]

Strongert et al.

[11] Patent Number: 4,648,431

[45] Date of Patent: Mar. 10, 1987

[54] HAND CONTROLLED FILLING VALVE FOR FILLING CONTAINERS WITH GASEOUS MEDIUM

[75] Inventors: Lars H. Strongert; Sten O. T. Lindgren, both of Linköping, Sweden

[73] Assignee: Spiromec AB, Linköping, Sweden

[21] Appl. No.: 776,381

[22] Filed: Sep. 17, 1985

[30] Foreign Application Priority Data

Sep. 17, 1984 [SE] Sweden ................................ 8404666

[51] Int. Cl.[4] ......................... B65B 3/04; F16K 11/14

[52] U.S. Cl. ........................................ 141/18; 141/21; 141/57; 141/301; 137/596.2; 137/627.5

[58] Field of Search ...................... 141/18, 2, 3, 20, 21, 141/29, 54, 57, 302; 137/596.2, 627.5

[56] References Cited

U.S. PATENT DOCUMENTS

| | | | |
|---|---|---|---|
| 3,026,908 | 3/1962 | Blair | 137/596.2 |
| 3,473,566 | 10/1969 | Peppel | 137/596.2 |
| 3,554,091 | 1/1971 | Spyridakis et al. | 137/596.2 X |
| 3,744,526 | 7/1973 | MacNiel | 141/18 X |
| 3,795,255 | 3/1974 | Malott et al. | 137/596.2 X |
| 3,937,257 | 2/1976 | Biro | 141/3 |
| 4,064,910 | 12/1977 | Weisenberger | 137/627.5 |
| 4,172,619 | 10/1979 | Anderson et al. | 137/627.5 X |
| 4,526,197 | 7/1985 | Martin et al. | 137/596.2 |

FOREIGN PATENT DOCUMENTS 350824 11/1972 Sweden .

*Primary Examiner*—Charles E. Phillips
*Assistant Examiner*—Ernest G. Cusick
*Attorney, Agent, or Firm*—Holman & Stern

[57] ABSTRACT

A filling valve for filling compressed gas into gas containers or tubes, comprising an inlet (11) to the valve housing (10), an outlet (12) for connection to the container or tube, an outlet for venting air and a connected channel, in which a spring loaded cone (37) of a high pressure valve is actuated to closing or opening by a displaceable spindle, which is moved by a lever (16) actuated by hand to actuate, via an operating piston (22), the spindle to arrive into three different positions, which allow shut-off, opening and venting, respectively, of the filling valve.

4 Claims, 4 Drawing Figures

HAND CONTROLLED FILLING VALVE FOR FILLING CONTAINERS WITH GASEOUS MEDIUM

BACKGROUND OF THE INVENTION

1. Field of the Invention

The present invention relates to filling valves, intended for the filling of gas tubes or containers with gas from compressors or pressure containers, preferably from air compressors where the connection to the compressor is by means of the inlet of the filling valve.

2. Description of the Prior Art

Hitherto, needle valves have been used for filling gas containers. Gas containers of this type often are used by personnel in fire brigades, which for their firemen equipped with smoke helmets among other things, use respirators connected to the gas containers. The air, or the gas mixture, that is used for breathing purposes must be completely dry as well as completely clean.

The filling of gas containers is daily work taking place at filling stations and the demands for rapidity and safety in the filling operations must be set high. The demands for safety of the service personnel handling the containers or the tubes at the filling ramps must also be considered, so that damages do not occur to individuals and materials due to unreliable valves. It is also important, for example, when a hose breaks during the filling of gas under elevated pressures, that the risks of damage can be eliminated.

Needle valves, which have been used for the filling of air in gas containers, have a tendency to be worn too fast, principally in the threads, resulting in unacceptable leakage.

A needle valve provided with threads requires for good performance during opening and closing that some kind of lubricating takes place; otherwise, the threads will seize. When the valve is forced to function in dry air, not having any lubricating properties, the valve wears out too rapidly and will become unusable too quickly. As a consequence, there will be large costs for the replacement of needle valves, as their lives are too short. For a filling operation, it is necessary to use two needle valves. As safety in the filling operation is an essential demand, and the drawbacks with initial leakage already after approximately 200 filling operations are evident, it is important to find a better technical solution of the problems encountered in filling gas containers.

To use other types of valves, intended for the filling of other mediums than air, for example, filling valves for liquified petroleum gas, are not possible. The Swedish Pat. No. 350,824 that relates to just such a valve, does not show such constructional features and embodiments that are required because it has a ball-shaped valve body, without small seat and cone areas which are necessary for work with high pressures. This filling valve has no similarities in other respects with the filling valve according to the invention, as it furthermore is intended for the filling of liquified petroleum gas and not for the filling of dry gas, such as air, for example.

Also, other technical solutions such as ball valves provided with throttle nozzles have been tested for the filling of air in tubes and containers. In this case, however, it is necessary to use two valves of that type for the filling operation. This contributes to the fact that the work tends to be difficult as it results in a number of hand operations which do not come in a logical succession. This is obviously a further drawback.

The life of such valves is not especially great either, but may be better than for needle valves. The valves function up to approximately 1,000 filling operations.

BRIEF SUMMARY OF THE INVENTION

With knowledge of the drawbacks associated with valves of these types, the filling valve of this invention has been made to solve the problems. In order to meet the demand for reliability, it is essential that no parts become worn out quickly and unpredictably. As the valve will work under high pressure, great forces will be transferred to valve cones and seats. It is an object of the invention to eliminate this drawback. Within the scope of the invention this is solved by means of giving small dimensions to the tightening seats and the contact surfaces, so that the parts of the valve will not be loaded with forces that are too great at high pressures against these surfaces.

At the same time, the valve is smooth operating amd easy and simple to handle manually. With the filling valve according to the invention, this is possible by means of the working operations, opening, closing and venting, taking place in a logical succession at a filling ramp for a number of containers or tubes.

It is essential that the working operations run quickly without the risk of error in the maneuvering of the valve, and that closing and exchange of gas tubes can take place continuously. If there is risk of a hose break, for example, due to over-filling of containers with gas under pressure being high, or for other reasons, the present valve provides that the air flowing from the compressor will have a reduced discharge velocity, by means of a throttle nozzle in the inlet port of the valve. If a hose should break otherwise, the piece of the hose that conveys the high pressure (working pressure 300 bars) of compressor air would "whip" around and make it difficult for anyone of the service personnel to reach the shut-off cock at the ramp, without being injured by the hose. As a hose break cannot be predictable, it can happen that service personnel, that quite naturally must stay near the filling valves, completely unprepared will be hit by a "whipping" hose stump or piece of hose. This has happened in practice, and being struck by a hose under high pressure can cause injury to the person hit.

The valve completes in a way of safety the system in which it forms a part, viz. that which includes a sliding filling coupling with a safety valve for hose breaks in the form of a resetting valve provided between the gas container and the filling valve. The resetting valve allows, however, that a small flow of approximately 50 liters per minute can pass at venting, and discharge. Under these circumstances, the filling valve and the coupling are attached to the container or the tube.

Another object of the present invention is to provide a valve that eliminates in high degree the inconveniences that are evident in known valves, so that it has a longer life, and in connection with this a better safety during operation.

Within the scope of the invention the valve can be connected to a compressor, but for the filling of a number of containers simultaneously, it is preferred that a filling valve needed for each container is connected to a ramp, which has a common feeding conduit from a compressor. Necessary manometers are connected to the valve for practical reasons for measuring the current pressure used for the containers in question.

BRIEF DESCRIPTION OF THE DRAWINGS

These and other details and advantages characterizing the invention will be explained in greater detail with reference to the accompanying drawings that show the filling valve inserted and the different positions that movable components take for opening, closing and venting functions, wherein.

DETAILED DESCRIPTION

Figure 1:
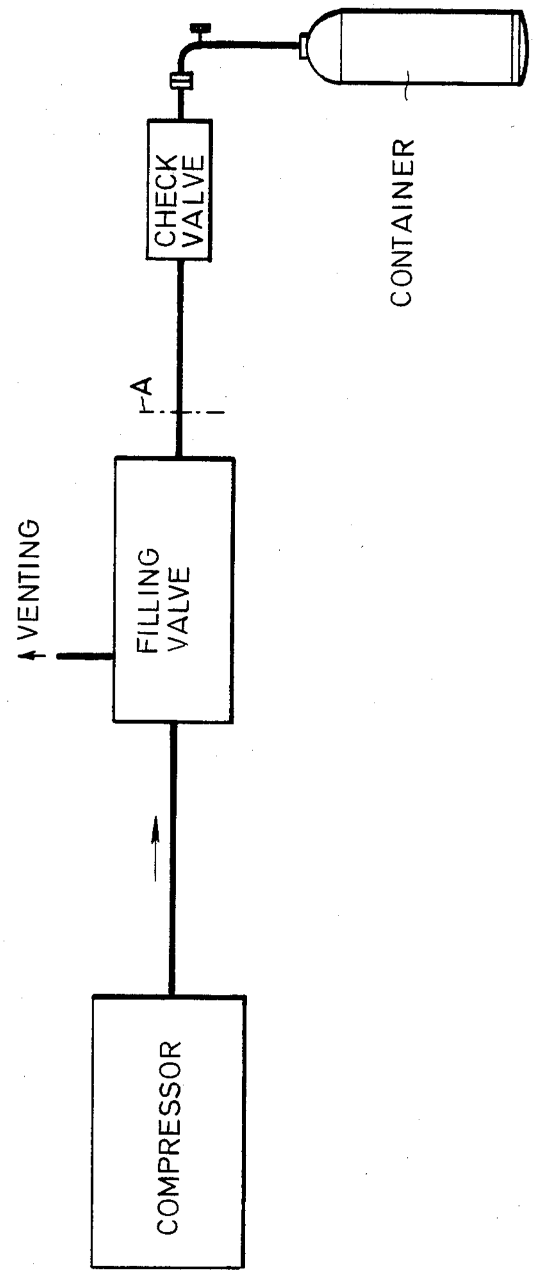
FIG. 1 is a schematic diagram showing a filling operation of gas in a container.
Figure 2:
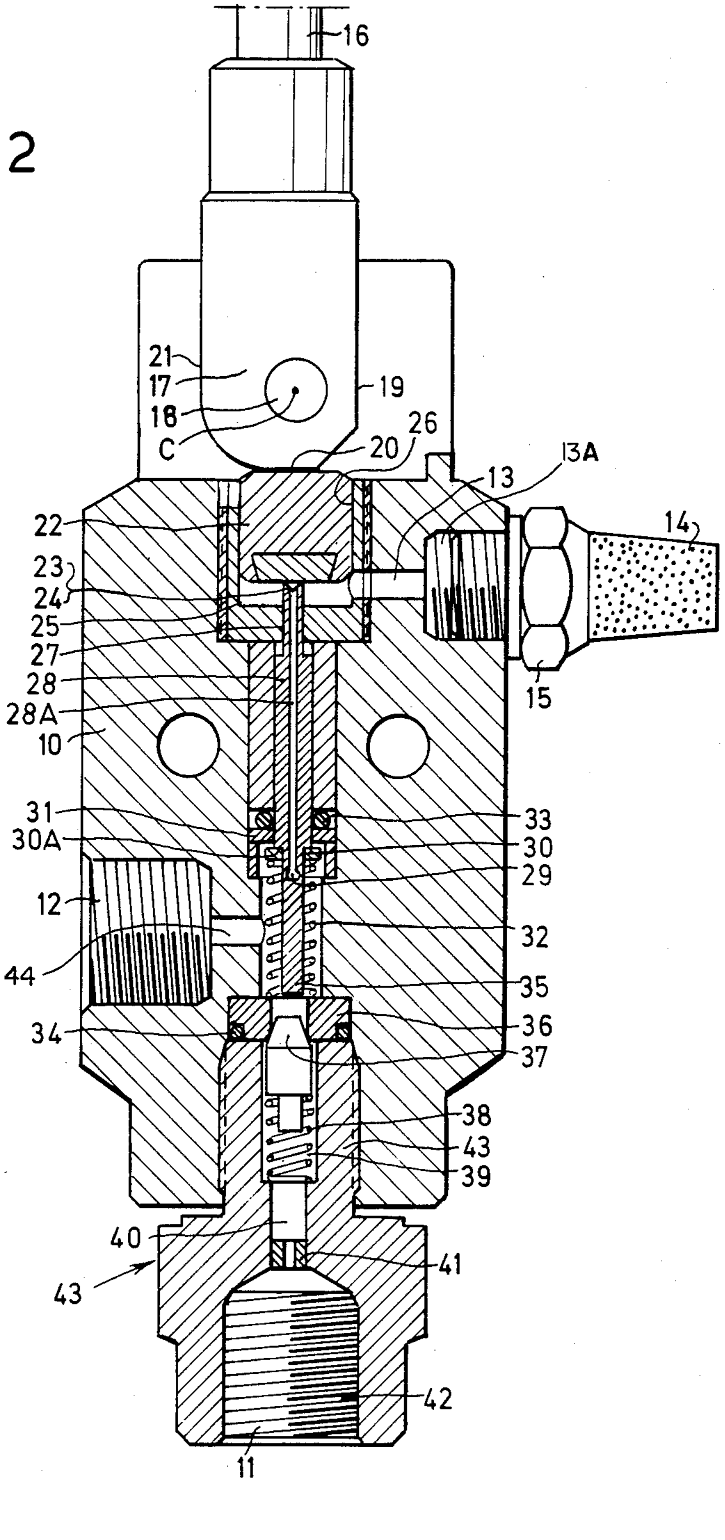
FIG. 2 is a partially axial cross-sectional view of a filling valve of the invention in closed position, but still under pressure, where no venting has previously taken place.
Figure 3:
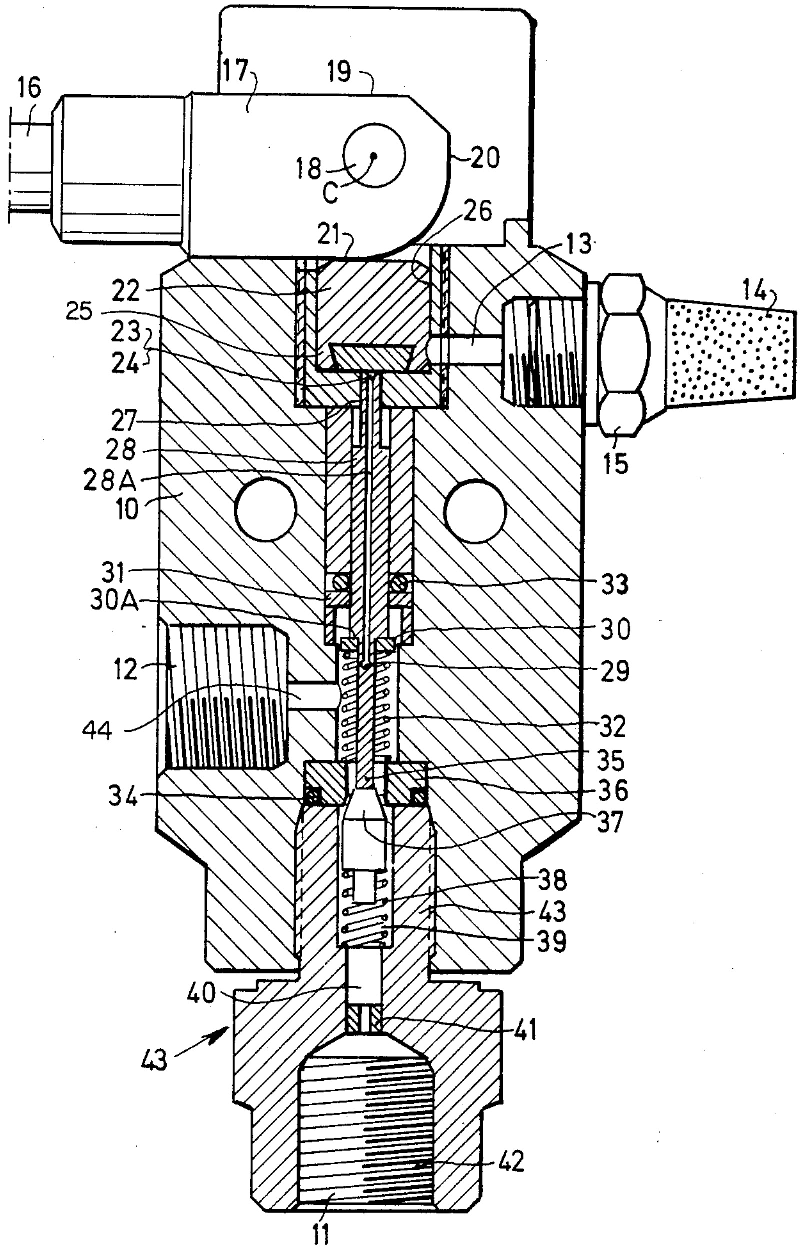
FIG. 3 is a view similar to FIG. 2 showing the filling valve in an opening position.
Figure 4:
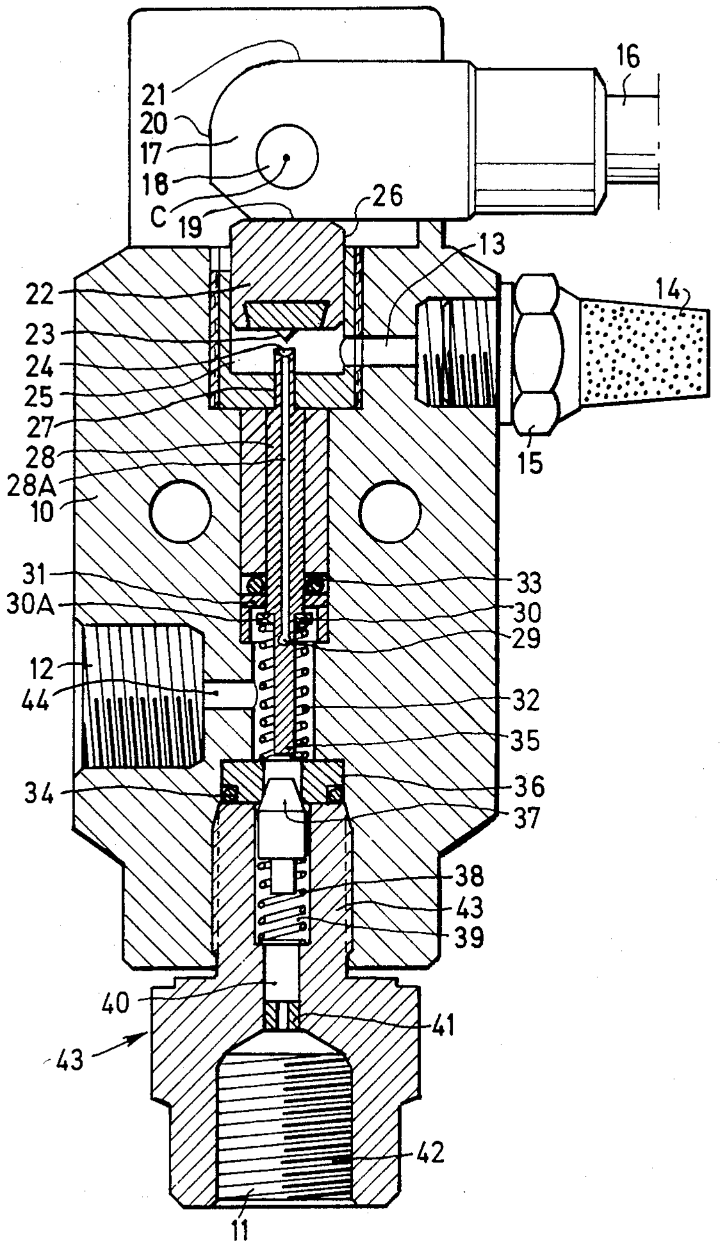
FIG. 4 is a view similar to FIG. 2 showing the filling valve in a venting position.

The valve shown in FIGS. 2–4 has a valve housing 10 comprising a solid body of metal. An inlet 11 having a threaded connection 42 for the compressor conduit is provided in a valve body 43 threadedly connected to the lower part of the valve housing. An outlet 12 for compressed air from the compressor is provided in the side of the valve housing, and is connected with a gas container by means of a threaded attachment and hose coupling as shown in FIG. 1.

In the end of the valve housing, opposite to the inlet 11, a piston housing 26 is provided as a cylinder for an operating piston 22, the cylinder being circular and formed as a straight piston bore 25, extending some length into the valve housing. In the bottom of this piston bore 25 and in the center of the bottom of housing 26, a circular opening passage 27 is provided for a spindle 28, which up to approximately two-thirds of its length is hollow by being drilled to produce a channel 28A for the passage of venting air.

In the lower part of the piston bore, in its wall, i.e. in the piston housing 26, a circular channel opening 13 is provided extending perpendicularly out to the side opposite from the outlet opening 12 of the valve housing 10, whereby this channel conveys venting air out from the valve housing via a threaded opening 13A provided in the valve housing, to which opening a fitting 15 is connected, comprising a noise-suppression device including a sintered filter 14, through which venting air can pass out to the open atmosphere without unpleasant noise for the service personnel.

The operating piston 22 is displaceable in its bore by means of a pivotable lever 16 arranged straight above the operating piston. The lever 16 can be set in three distinct positions by being manually moved to pivot around a fixed axis C lying in a plane perpendicular to the vertical plane. A fixed pivot 18, arranged in this plane, runs through a hole in the end of the lever which is in contact with the operating piston 22, so that the center of the through hole coincides with the pivot axis C. The lever is so attached on the pivot 18 that a moving of the lever in the vertical plane can take place, with freedom from play, into three distinct positions. These positions are set, when a cam 17, shaped at the end of the lever, for cam-controlling, is in contact with the horizontal top-surface of the operating piston 22 with the land surface 19 of the cam 17 corresponding to venting, and in shut-off position and in filling position when in contact with the top-surface of the control piston with the land surfaces 20 and 21, respectively.

The venting function of the valve is provided by the venting valve components which will now be described.

The operating piston 22 has an enclosed plate in its end face opposite to the top-surface, in the center of which is a valve member 23 having dimensions so that it fully closes, or seats, against the small seat 24 arranged at the upper end of spindle 28 that is displaceable into the bottom of the piston bore 25 through the passage 27. It is essential that the contact surfaces between the valve member and seat are small and do not produce great forces at high pressures and wear on included parts in the valve. Repeated contact between the surfaces at several fillings daily demand that the material of the valve member 23 and spindle seat 24 has good resistance to wear in combination with a good seating fit of the valve member and seat against each other.

The spindle 28 extends down into a channel centrally located in the valve, so that said channel is in alignment with and meets the channel 40, arranged in the valve body 43 for the inflow of compressor air, and the continuation of said channel 40 in the cone bore 39.

In the bottom of the drilled channel 28A a through hole 1 mm in diameter 29 is arranged, perpendicular to the spindle wall for the inflow of air, which will pass out from the cavities of the valve after closing of the gas container and out from the inflow channel connected to the threaded coupling attached to the compressor. The lower third part of the spindle 28, disposed in the inflow channel, transforms into a solid part and has a somewhat smaller diameter. The lower end 35 of the spindle extends to a position, which is located in such adjusted distance from the top of the cone valve member 37, that at the position of the lever 16 for closing, the end 35 of the spindle has sufficient play to the top of the cone valve member so that at further displacement of the spindle, corresponding to an opening position, the spindle end pushes against the top of the cone valve member, and against the action of the spring 38 in the cone bore 39, and thereby presses down the cone valve member 37 enough to create necessary free passage of compressed air from the compressor through the valve seat 36.

The solid lower third part of the spindle 28 passes through a hollow, loose circular washer 30, which is fitted up against the end surface 30A of the spindle which serves as support for the resetting spring 32. This resetting spring encircles the solid end of the spindle and has its opposite end supported on the valve seat 36 of the cone 37. The washer 30 is located in a guiding sleeve 31, surrounding the part of the spindle 28 adjacent where it is transformed into a smaller diameter.

Above the guiding sleeve 31, which is penetrated by the spindle 28, a circular hollow sealing element 33 is arranged and seals directly against the envelop surface of the spindle.

The valve seat 36 is closely connected to the valve body 43 by means of a gasket ring 34.

It is important that sealing elements, and especially the sealing element 33, have long life and a surface resistant to wear. Such an element has been found in a sealing ring of teflon with self-lubricating properties, which makes it possible to obtain good service for this function.

In the inlet 40 for compressed air a throttle sleeve 41 is arranged, through which air passes during the filling operation carried out with an appropriate filling velocity. This is achieved by setting the diameter of the channel of the throttle sleeve at 1.6 mm.

For the passage of compressed air into the gas container a connection channel 44 is arranged in communication with the outlet opening 12 of the valve housing 10, wherefrom it concentrically extends perpendicular to the channel wherein the solid part of the spindle 28 together with the resetting spring 32 are displaceably arranged.

The filling of gas tubes with gas from a compressor takes place by using the filling valve according to the invention in the following manner.

At the starting point of the filling operation the lever 16 is placed in its center position as shown in FIG. 2. The gas container, which still is unopened, is coupled to the outlet 12 via a valve reducing the effects of hose breaks, in the form of a check valve, and the connection of the inlet 11 of the valve to a feeding conduit of the compressor is made by means of a conventional threaded fitting attachment in a reliable way (FIG. 1). The cam 17 of the lever with the land surface 20 pushes down the operating piston 22 and the valve member 23 into a tightened fit against the valve seat 24 of the spindle 28. At the same time the spindle is displaced a short distance downwardly. A play arises as shown in FIG. 2 between the upper narrow part of the spindle and the upper wall section part of the guide channel of the spindle in the filling valve. By the action of the resetting spring 32 against the spindle 28, via the washer 30 and the fixed support of the resetting spring against the land surface of the valve seat 36, the channel 28A is sealed at the valve seat 24.

The valve of the gas container will now be opened and sets the filling valve under pressure with remaining pressure from the container, if any, but the hollow drilled channel 28A is still sealed, as mentioned above, and the teflon ring 33 seals between the envelope surface of the spindle and the wall of its guiding channel.

The lever 16 is moved to an opening position shown in FIG. 3 for filling of gas into the gas container where the control cam 17 contacts with the land surface 21 and pushes the piston 22 and spindle 28 a further short distance downwardly in the replacement channel of the spindle into contact of the solid spindle end 35 against the valve cone 37, which against the action of the resetting spring is moved from its seated position in the valve seat 36 and allows free passage for compressed air to flow in and fill the container via the valve cone bore, the cavity of the resetting spring 32 and the connection channel 44 to the container.

When the container is filled to a desired pressure, the lever 16 is again moved to the middle position (FIG. 2), a shut-off position for the filling valve, whereby the spindle returns to closed position by the force of the resetting spring 32, and by displacement upwards of the spindle, which now again seals against the valve member 23. Simultaneously, the pressure against the top of the valve cone 37 is removed when the lower end of the spindle is displaced upwardly from the valve seat 36. The valve cone 37 returns to closed position by means of the resetting spring 38 and the compression pressure.

The valve of the gas container is then closed and the lever 16 is moved to the venting position (FIG. 4) whereby the contact of the cam 17 against the operating piston 22 will be changed, so that the land surface 19 will be contacted and the operating piston 22 will be pressed upwards by the remaining pressure in the valve. The valve member 23 as a consequence is raised off of seat 24. The admitting port 29 and the channel 28A will then be in communication with the inlet 11 and outlet channel 44 of the gas container, and the included air, between the filling valve and gas container, is vented to the atmosphere via the venting channel 13 and the sound damper 14.

The throttle nozzle 41 in the inlet 11 of the filling valve allows appropriate filling velocity as mentioned, but also protects against too rapidly discharging the gas, if for example, a hose break takes place at A according to FIG. 1.

For the filling of a number of containers at the same time from a ramp, the valve of the gas container is left open, if time does not permit shut-off, whereby overfilling of the rest of the containers is avoided. The valves are then closed when all the containers have been filled.

The present invention makes it possible to achieve safety for the service personnel and reliability in the function of the valve as proven by practical tests conducted during quite a long time. Demounting of the valve and measuring of dimensions of movable components have shown that no noticeable wear has occurred after approximately 10,000 working cycles of the valve according to the invention.

We claim:

1. In a filling valve for filling containers with gas under pressure up to 300 bars, such as from a compressor, for example, the valve having a housing, a gas inlet in the housing for the gas under pressure, a gas outlet arranged on one side of the housing for connection to a container to be filled, a venting outlet arranged on the other side of the housing for venting to the atmosphere after a filling operation, an inlet channel in the housing between the gas inlet and gas outlet, a venting channel in the housing between the gas outlet and venting outlet, a venting valve in the venting channel, and an operating device for opening and closing the inlet channel and venting valve, the improvement comprising:

an extension of the inlet channel between the gas inlet and inlet channel;

an inlet valve seat in said extension;

a conical inlet valve in said extension operatively engageable with said inlet valve seat;

a valve resetting spring means for resiliently urging said inlet valve into sealing engagement with said inlet valve seat;

a further extension of the inlet channel between the inlet channel and the venting channel;

a spindle displaceably mounted in the housing having a part thereof disposed in said further extension and having first and second ends, said first end engaging said inlet valve and being displaceable by the operating device for opening and closing said inlet valve;

a return spring means for resiliently urging said spindle in a direction opposite to said displacement by the operating device;

said venting channel comprising a straight hollow spindle channel concentrically arranged in said spindle and having an inner end, a spindle channel inlet port extending through said spindle and communicating said inner end of said spindle channel with said further extension of said inlet channel, and a further channel having one end communicating with said venting outlet;

a venting valve seat on said second end of said spindle and forming part of said spindle channel;

an operating piston displaceably mounted in a piston bore in said housing; and a venting valve member on said piston operatively engageable with said venting valve seat for opening and closing said spindle channel;

said further venting channel having an end communicating with said piston bore;

the operating device being adapted in a filling position to move said operating piston so that said venting valve member engages said venting valve seat to close said spindle channel and displace said spindle to open said inlet valve for filling a container, in a closed position to move said operating piston into closing engagement between said venting valve member and said venting valve seat and said resetting spring closes said inlet valve, and in a venting position to set said operating piston in a position where said venting valve member is disengaged from said venting valve seat and said inlet valve is closed by said resetting spring.

2. A filling valve as claimed in claim 1 and further comprising:

a throttle nozzle in said inlet channel extension upstream of said inlet valve between the inlet and said inlet valve, for controlling the flow of filling gas to the container between 300 and 600 liters per minute at a pressure of 300 bars.

3. A filling valve as claimed in claim 2 wherein said operating device comprises:

a pivot member mounted on the housing and having a pivot axis lying in a plane extending perpendicular to the direction of movement of said operating piston;

a lever pivotably mounted on said pivot member and having an operating end; and a cam on said operating end of said lever having three distinct cam surfaces engageable with an outer end of said operating piston for setting said operating piston in a first position corresponding to said venting position, a second partially depressed position corresponding to said closed position, and a third fully depressed position corresponding to said filling position.

4. A filling valve as claimed in claim 1 wherein said operating device comprises:

a pivot member mounted on the housing and having a pivot axis lying in a plane extending perpendicular to the direction of movement of said operating piston;

a lever pivotably mounted on said pivot member and having an operating end; and a cam on said operating end of said lever having three distinct cam surfaces engageable with an outer end of said operating piston for setting said operating piston in a first position corresponding to said venting position, a second partially depressed position corresponding to said closed position, and a third fully depressed position corresponding to said filling position.

* * * * *